United States Patent [19]

Kamei et al.

[11] Patent Number: 4,869,822

[45] Date of Patent: Sep. 26, 1989

[54] FILTER APPARATUS EMPLOYING HOLLOW FIBERS

[75] Inventors: Eiichi Kamei; Yasushi Shimomura, both of Hirakata, Japan

[73] Assignees: Ube Industries, Ltd., Yamaguchi; Toyo Roshi Kaisha Ltd., Tokyo, both of Japan

[21] Appl. No.: 238,993

[22] Filed: Aug. 29, 1988

Related U.S. Application Data

[63] Continuation of Ser. No. 913,342, Sep. 29, 1986, abandoned.

[30] Foreign Application Priority Data

Sep. 27, 1985 [JP] Japan ................................ 60-212675

[51] Int. Cl.$^4$ ............................................ B01D 13/01
[52] U.S. Cl. ......................... 210/321.79; 210/321.88; 210/440; 210/446
[58] Field of Search ................ 210/158, 321.6, 321.61, 210/321.64, 321.78, 321.79, 321.8, 321.87, 321.88, 321.89, 440, 443, 446, 323.2, 340, 433.2, 438

[56] References Cited

U.S. PATENT DOCUMENTS

| | | | |
|---|---|---|---|
| 3,505,686 | 4/1970 | Bodell | 210/321.8 |
| 3,690,465 | 9/1972 | McGinnis et al. | 210/321 |
| 4,244,820 | 1/1981 | Hauk et al. | 210/321.8 |
| 4,547,289 | 10/1985 | Okano et al. | 210/321.89 |
| 4,622,143 | 11/1986 | Edwards | 210/321.1 |
| 4,715,952 | 12/1987 | Casey, Jr. | 210/321.8 |
| 4,752,305 | 6/1988 | Johnson | 210/321.8 |

OTHER PUBLICATIONS

Shah, Dilip et al., International Publication No. WO84/01522, Apr. 26, 1984.

Primary Examiner—Richard V. Fisher
Assistant Examiner—Wanda L. Millard
Attorney, Agent, or Firm—Frishauf, Holtz, Goodman & Woodward

[57] ABSTRACT

A filter apparatus comprises a housing having a liquid entrance, a liquid exit, and two tubes protruding from a wall of the housing into an inner space of the housing. The tubes have openings which face each other and have at least one perforation or side opening on their walls, one of the liquid entrance and the liquid exit being connected to one of the tubes. The detachable filter cartridge comprises an outer perforated cylinder, an inner non-perforated cylinder, the outer cylinder being connected to the inner cylinder in coaxial relationship such that a respective end space for receiving a liquid is formed inside each end of the outer cylinder. A bundle of porous hollow fibers is connected between the outer cylinder and the inner cylinder such that openings at both opposite ends of the hollow fibers open to allow passage of liquid from one end space for receiving liquid to another end space via the hollow fibers. The filter cartridge is arranged such that each open end of the inner cylinder sealingly receives therein a respective one of the tubes to form a liquid passage between the two tubes via the inner space of the inner cylinder, and a liquid passage between two tubes via the perforations of one tube, one of the end spaces, the porous hollow tubes, the other of said end spaces, and the perforations of another tube.

7 Claims, 1 Drawing Sheet

FILTER APPARATUS EMPLOYING HOLLOW FIBERS

This application is a Continuation Division, of application Ser. No. 06/913,342, filed Sept. 29, 1986, now abandoned.

BACKGROUND OF THE INVENTION

1. Field of invention

This invention relates to a filter apparatus employing porous hollow fibers, advantageously employable for bacteria from a liquid.

2. Description of prior arts

When filtration of a liquid is carried out in a large amount and in an industrial scale, there is widely used a filter apparatus comprising a housing and a filter cartridge which utilizes a filter member obtained by folding (called "pleating") a plane porous membrane. The cartridge using the pleated porous membrane (which is called "microfilter") for filtration is called "cartridge type microfilter".

In the cartridge type microfilter, microfilters (porous membranes) have different pore sizes are used depending on the purposes such as dust-removing or bacteria-removing from water, juice, alcoholic drinks or pharmaceuticals and air-cleaning, to filter and separate out fine particles or bacteria having sizes of about 0.05 to 10 $\mu$m.

As the conventional cartridge type microfilters having been widely used, cartriges having prescribed dimensions in the length and diameter have been generally used. Accordingly, there has been necessarily a limitation in enlarging the membrane area by folding the plane porous membrane used in the cartridge, and also limitation in the filtration capacity.

Recently, porous membrane filters capable of removing more minute solid particles or bacteria have been in demand. However, as the pore size of a porous membrane is made smaller, the filtration capacity becomes smaller.

In place of the porous membrane, a porous hollow fiber having a tubular wall on which a great number of pores are provided have been proposed as filter member. The porous hollow fiber is employed as filter member in the form of a bundle of a great number of porous hollow fibers. However, the previously proposed filter cartriges using porous hollow fibers are not appropriate for use in the known housing for filter cartridge and the advantageous characteristics of the porous hollow fibers are not effectively utilized.

SUMMARY OF THE INVENTION

An object of the present invention is to provide a filter apparatus having increased filtration capacity.

Another object of the invention is to provide a filter apparatus having increased filtration capacity without enlarging its size beyond the conventional filter apparatus.

A further object of the invention is to provide a filter cartridge having increased filtration capacity without enlarging its size beyond the conventional filter cartridge.

There is provided by the present invention, in one aspect, a filter apparatus comprising a housing and a filter cartridge arranged within the housing wherein said housing has at least one entrance for liquid, at least one exit for liquid, and two tubes protruding from wall of the housing into the inner space of the housing to face their openings to each other and having a window on their walls, one of the entrance and the exit being connected to one of the tubes; and said filter cartridge comprises an outer cylinder having a window on its wall, an inner cylinder having no window on its wall, potting members binding coaxially said outer cylinder and said inner cylinder therewith in such manner that a room for receiving liquid is formed inside of each end of the outer cylinder, and a bundle of porous hollow fibers potted by the potting members between the outer cylinder and the inner cylinder in such manner that both openings of the hollow fibers are opened on the potting members to allow passage of liquid from one room for receiving liquid to another room via the hollow fibers, said filter cartridge being detachably arranged within the housing in such manner that each of open ends of the inner cylinder hermeticaly receives therein each of the tubes protruding from wall of the housing to form a passage of liquid between the two tubes via inner space of the inner cylinder and a passage of liquid between two tubes via the window of one tube, the room for receiving liquid of one end, the porous hollow tubes, the room for receiving liquid of another end, and the window of another tube.

In another aspect, the present invention provies a filter apparatus comprising a housing and a filter cartridge arranged within the housing wherein.

said housing has at least one entrance for liquid, at least one exit for liquid, and two tubes protruding from wall of the housing into the inner space of the housing to face their openings to each other, one of the entrance and the exit being connected to one of the tubes; and said filter cartridge comprises an outer cylinder having a window on its wall, an inner cylinder having no window on its wall, potting members binding coaxially said outer cylinder and said inner cylinder therewith in such manner that a room for receiving liquid is formed inside of each end of the outer cylinder, and a bundle of porous hollow fibers potted by the potting members between the outer cylinder and the inner cylinder in such manner that both openings of the hollow fibers are opened on the potting members to allow passage of liquid from one room for receiving liquid to another room via the hollow fibers, said filter cartridge being detachably arranged within the housing in such manner that each of open ends of the outer cylinder is hermeticaly connected to each of the tubes protruding from wall of the housing to form a passage of liquid between the two tubes via inner space of the inner cylinder and a passage of liquid between two tubes via the room for receiving liquid of one end, the porous hollow tubes, and the room for receiving liquid of another end.

The housing of the filter apparatus according to the invention preferably is in the form of a cylinder with a closing cap at each end. At least one cap is detachably equipped to the cylindrical housing. Preferably, both closing caps are detachably provided to the cylindrical housing. Each of the two protruding tubes are preferably fixed on the inner surface of each cap. The entrance for liquid and the exit for liquid are preferably arranged on the cap in such manner that the exit or the entrance is connected to the protruding tube to pass a liquid therethrough. The exit for liquid is preferably provided in plural in such manner that the entrance for liquid and one exit for liquid are arranged on the cap at one end and another exit for liquid is arranged on the cap at another end and that each of the two exits is connected to each of the protruding tubes provided on the caps. In this embodiment, the exit can be exchanged in the function with the entrance.

The porous hollow bundle is made by bundling a number of porous hollow fibers of a synthetic resin such as polypropylene each having, for example, an outer diameter of 400 μm, an inner diameter of 300 μm and such a pore size that can block fine particles or bacteria of 0.1 μm or more.

DETAILED DESCRIPTION OF THE INVENTION

Figure 1:
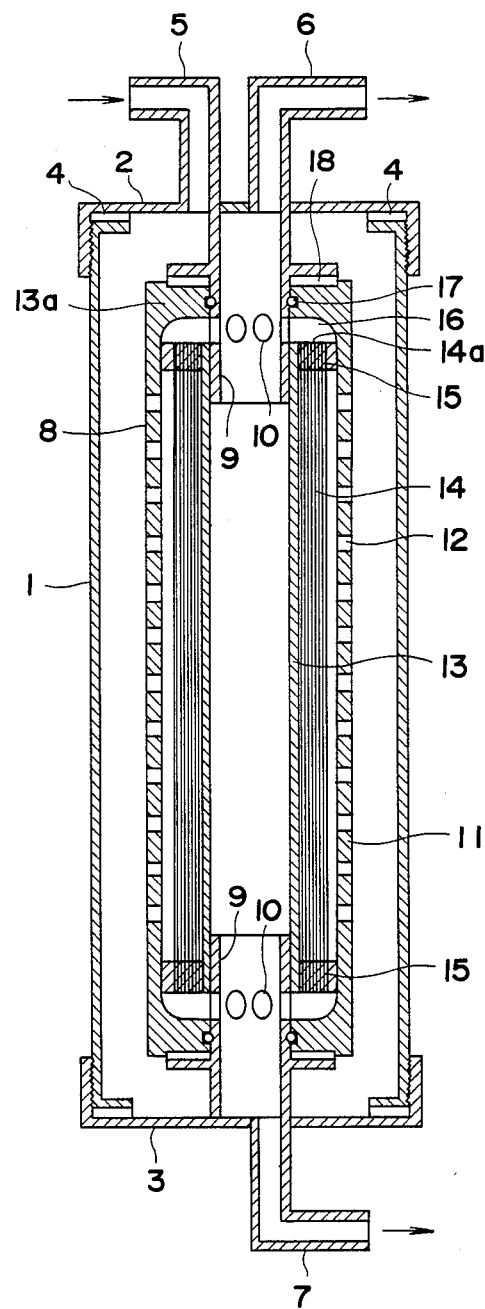
FIG. 1 is a longitudinal section view showing one embodiment of this invention.

The present invention is now described by referring to an embodiment illustrated in FIG. 1.

FIG. 1 shows an embodiment of the filter apparatus employing a detachable filter cartridge. In FIG. 1, numeral 1 denotes a cylindrical housing for the cylindrical cartridge, and numerals 2 and 3 denote caps of the housing 1. The caps 2 and 3 are detachably fitted to both ends of the housing 1 by means of screw threads and packing 4. The cap 2 is equipped with a liquid inlet pipe (i.e., entrance for liquid) 5 and a liquid outlet pipe (i.e., exit for liquid) 6. The cap 3 is provided with only a liquid outlet pipe (i.e., exit for liquid) 7. The outlet pipe 7, however, need not be provided to the cap 3. This means that the cap 3 can be a blank cap. The caps 2 and 3 are equipped, at their back sides (i.e., inner sides), with cylindrical protruding tubes 9 extending toward an inner cylinder of a cartridge 8 mentioned below, and several number of through holes (i.e., windows) 10 are provided on middle portions of the walls of the protruding tubes 9.

Numeral 8 denotes a cartridge. The cartridge 8 comprises an outer cylinder 11 having a number of liquid flow path holes 12 on the peripheral wall thereof, an inner cylinder 13 having no holes, a number of porous hollow fibers 14 arranged in parallel, and a pair of potting members 15 which support both ends of the porous hollow fibers 14 to fit them in a space between the outer cylinder 11 and the inner cylinder 13. At both ends of the outer cylinder 11, there are provided flanges 13a extending to the position of the same diameter as the inner wall face of the inner cylinder 13, so that filtered liquid collection or space 16 (i.e., rooms or spaces for receiving liquid) are provided in the spaces defined by the inside of the flanges 13a, liquid outlets 14a which are the open end faces of the porous hollow fibers 14, and the end faces of the potting members 15, respectively. The filtered liquid collection rooms or spaces 16 are communicated with the inside of the inner protruding tubes 9 of the caps 2 and 3, respectively, and thereby communicate with filtered liquid flow-out portions such as outlet 6.

O-rings 17 and flat packings 18 are inserted to the contact surfaces between the protruding tubes 9 and the flanges 13a of the outer cylinder 11 to prevent leakage of liquid.

The outer cylinder 11 comprises a side portion (or a cylinder peripheral wall) having liquid flow path holes 12. The flow path holes 12 may have the number and size that can sufficiently pass the flowing liquid. The inner cylinder 13 has no holes.

As an example, the outer cylinder 11 is prepared having an outer diameter of 70 mm and a wall thickness of 5 mm, provided in the peripheral direction and the height direction and at an interval of about 5 mm with a number of liquid flow path holes 12 each having the size of 15 mm in the outer peripheral direction of the peripheral wall of the cylinder and a width of 5 mm. The inner cylinder 13 having an outer diameter of 34 mm and a wall thickness of 3 mm and having no holes is arranged to be made concentric with the inner cylinder 13. Into the space between the outer cylinder 11 and the inner cylinder 13, the porous hollow fibers 14 for blocking fine particles or bacteria of 0.1 μm or more, made of polypropylene having an outer diameter of 400 μm and an inner diameter of 300 μm and bundled in the form of a ring, are inserted to form a hollow fiber member. The open ends of the hollow fibers 14 are supported and fixed by means of the potting member 15 made of polyurethane, with the ends of the fibers kept open as described before, and then the inner and outer cylinders 13 and 11 are fixed to make up a body integrally assembled with the inner and outer cylinders 13 and 11 and the hollow fibers 14. The porous hollow fibers 14, however, may not be limitative in their material and size, so long as they can perform the ultrafiltration and the precision filtration.

The potting member 15 may be of adhesive material of a two liquid reactive type. There may be used any kinds of materials, so long as no component of the adhesive materials is eluted into the liquid to be treated or no denaturation or the like may occur due to a liquid to be treated. Preferably, the potting member is made of polyurethane or epoxy resin.

The cartridge 8 thus produced has dimentions of, for example, 250 mm in length and 70 mm in diameter. The bundle of porous polypropylene hollow fibers have an effective total membrane area of 1.5 m².

In the filter cartridge illustrated in FIG. 1 placed in a cylindrical housing, a liquid flows into a space defined between the housing outside of an outer cylinder, passes through a large number of liquid flow path holes 12 provided on the peripheral wall of the outer cylinder 11 to reach to the outer side of a number of porous hollow fibers 14, and then reaches to the hollows in the porous hollow fibers 14 through pores on the peripheral wall of the same. At this stage, only clean liquid passes through the peripheral walls of the porous hollow fibers 14, and fine particles such as dust or bacteria can not pass through the pores of the porous hollow fibers to have been held on the outer walls of the porous hollow fibers. The clean liquid having reached to a filtered liquid collection room or rooms through the porous hollow fibers is flowed out to the outside from the outlet or outlets 6, 7, where it is used.

In one example, the cartridge 8 of the invention was fitted with packings 18 at the periphery of its externally flowing outlet, and inserted in a housing designed for the commercially available standard cartridge to measure the water permeation amount. As a result, the initial flowing amount was found to be 2,700 l/hr·kg./cm². Also, using microplasmas which were indicator strains of 0.1 μm, bacteria-removing efficiency of the cartridge of the present invention was measured to have found no leakage of bacteria.

For comparison, prepared were the outer cylinder 11 having liquid flow path holes 12 on the peripheral wall of the outer cylinder, and the inner cylinder 13 are made concentric with the former. Thereafter, into the space defined between them, a conventional porous flat membrane was folded and inserted. The outer cylinder 11, the inner cylinder 13 and the flat membrane were fixed to each other and supported by means of the potting members 15 to form a cartridge of a conventional type, having a length of 250 mm, a diameter of 70 mm and an effective membrane area of 0.42 m². The cartridge obtained was inserted into a housing employed in the above-mentioned example to measure the water permeation amount. As a result, the initial; flowing amount was determined to be 1630 l/hr·kg./cm².

Using Pseudomonas dimuters which were indicator strains of 0.2 μm, bacteria-removing efficiency of this cartridge was measured with the challenge bacterial number of 3.6× $^{11}$. As a result, LRV [log$_{10}$ (total number of filtered bacteria/number of leaked bacterial)] was observed to be 11 or more. Although there was no leakage of bacteria having the size of 0.2 μm, leakage of bacteria was observed as in the microplasmas which were indicator strains of 0.1 μm.

In FIG. 1, the filter apparatus having protruding tubes 9 have windows on their walls is shown, The protruding tubes may have no such windows, provided that the end of the protruding tube is hermetically connected not to the end of the inner cylinder of the cartridge but to the end of the outer cylinder of the cartridge. In this embodiment, if one tube is connected neither to the exit for liquid nor to the entrance for liquid, such tube may be plugged.

As is apparent from the above results, according to this invention, more minute bacteria or finer particles can be blocked by a relatively small and simple device, and the cartridge can be made to have a large water permeation capacity. Moreover, it can be readily interchanged with a commercially available cartridge, and can be used with ease.

Moreover, the filter apparatus having two exits, one at each end of the housing, is advantageously employed in plural numbers in such a manner that the plural filter apparatuses are connected in series. Such series connected filter apparatuses are favorable because they can filter a great amount of a liquid smoothly, and because the direct liquid flow passage formed by the combination of the two exits and the protruding tubes with the inner space of the inner cylinder of the cartridge can adjust and buffer fluctuations of pressure produced in the plural filter apparatuses.

We claim:

1. A filter apparatus for separating solid material from a liquid, comprising:

a housing including a generally cylindrical body having opposite ends, a top cap coupled to one end of said body, a bottom cap coupled to an opposite end of said body, at least one of said top and bottom caps-being detachably coupled to said generally cylindrical body; and a filter cartridge exchangeably arranged within said housing; P1 said housing further including at least one liquid inlet for a liquid to be filtered, at least one liquid outlet for a filtrate, and two tubes each having at least one perforation or opening on a wall thereof, said tubes having portions protruding from said top cap and said bottom cap, respectively, into an inner space of said housing, said tubes having openings which face each other, at least one of said tubes being connected to said liquid outlet such that the filtrate passes through said at least one tube and said liquid outlet successively;

said exchangeable filter cartridge comprising an outer perforated cylinder member, an inner non-perforated cylinder member, potting members binding said outer cylinder member substantially coaxially with said inner cylinder member such that a respective end space for receiving the filtrate is formed inside each end of said outer cylinder member, and a bundle of porous hollow fibers potted by said potting members and arranged between said outer cylinder member and said inner cylinder member such that openings of the hollow fibers on both opposite sides thereof open on the potting members to respectively face each of said end spaces inside of each end of said outer cylinder member;

said outer cylinder member having open opposite ends, each of said open opposite ends being arranged to sealingly receive therein a respective one of said protruding portions of said tubes; and said inner cylinder member having open opposite ends and an inner space extending between said open opposite ends, each of said opposite end of said inner cylinder member being arranged to receive therein a respective one of said protruding portions of said tubes to form a passage for the filtrate between said tubes via said inner space of said inner cylinder member and a passage for the filtrate between said two tubes via said perforations of one of said tubes, said end space for receiving the filtrate at said one end of said outer cylinder member, said porous hollow fibers, said end space for receiving the filtrate at another end of said outer cylinder member, and said perforations of the other of said tubes.

said inner cylinder member having open opposite ends and an inner space extending between said open opposite ends, each of said open opposite ends of said inner cylinder member being arranged to sealingly receive therein a respective one of said protruding portions of said tubes to form a passage for the filtrate between said two tubes via said inner space of said inner cylinder member and a passage for the filtrate between said two tubes via said perforations of one of said tubes, said end space for receiving the filtrate at said one end of said outer cylinder member, said porous hollow fibers, said end space for receiving the filtrate at another end of said outer cylinder member, and said perforations of the other of said tubes.

2. The filter apparatus of claim 1, wherein said top cap and said bottom cap are both detachably coupled at the opposite ends of said generally cylindrical body of said housing.

3. The filter apparatus of claim 2, wherein said top cap and said bottom cap both are screw threadedly attached to the ends of said generally cylindrical body of said housing.

4. The filter apparatus of claim 1, wherein each of said top cap and said bottom cap is provided with a liquid outlet for filtrate.

5. The filter apparatus of claim 1, wherein said at least one liquid inlet comprises a single liquid inlet attached to one of said top and bottom caps.

6. The filter apparatus of claim 1, wherein said liquid inlet and said liquid outlet are arranged on one of said caps.

7. The filter apparatus of claim 1, wherein said liquid inlet and said liquid outlet are arranged only on one of said caps.

* * * * *